United States Patent
Dismukes et al.

(10) Patent No.: US 9,123,037 B2
(45) Date of Patent: Sep. 1, 2015

(54) FINANCIAL TRANSACTION TERMINAL

(71) Applicant: Equinox Payments, LLC, Scottsdale, AZ (US)

(72) Inventors: Chris Dismukes, Scottsdale, AZ (US); Norman Castner, Scottsdale, AZ (US); T K Cheung, Scottsdale, AZ (US); Will Rossiter, Scottsdale, AZ (US)

(73) Assignee: EQUINOX PAYMENTS, LLC., Scottsdale, AZ (US)

( * ) Notice: Subject to any disclaimer, the term of this patent is extended or adjusted under 35 U.S.C. 154(b) by 0 days.

(21) Appl. No.: 14/021,900

(22) Filed: Sep. 9, 2013

(65) Prior Publication Data
US 2014/0070000 A1 Mar. 13, 2014

Related U.S. Application Data

(60) Provisional application No. 61/699,530, filed on Sep. 11, 2012.

(51) Int. Cl.
G06Q 20/20 (2012.01)
G07G 1/00 (2006.01)
G07G 1/01 (2006.01)
G07G 1/14 (2006.01)

(52) U.S. Cl.
CPC ............. *G06Q 20/204* (2013.01); *G06Q 20/20* (2013.01); *G07G 1/0036* (2013.01); *G07G 1/01* (2013.01); *G07G 1/14* (2013.01)

(58) Field of Classification Search
CPC ... G06Q 20/20; G06Q 20/204; G06Q 20/209; G06Q 20/34; G06Q 30/00; G07G 1/00; G07G 1/0018; G07G 1/0036; G07G 1/01; G07G 1/06; G07G 1/14; G07G 5/00
USPC ................................. 235/380, 383
See application file for complete search history.

(56) References Cited

U.S. PATENT DOCUMENTS

2008/0249880 A1 10/2008 Liu et al.
2009/0138255 A1 5/2009 Sterling et al.

FOREIGN PATENT DOCUMENTS

WO 2006055002 A1 5/2006
WO 2011094424 A1 8/2011

OTHER PUBLICATIONS

International search report and written opinion dated Feb. 11, 2014 issued in corresponding PCT application PCT/US2013/058811.

*Primary Examiner* — Kristy A Haupt
(74) *Attorney, Agent, or Firm* — DLA PIPER LLP (US)

(57) ABSTRACT

The system provides a two device solution for transaction processing, a merchant facing device (MFD) and a cardholder (customer) facing device CFD. What this means is that one device always faces the checkout representative of the merchant (the merchant facing device) and the other faces the consumer (the cardholder facing device). The CFD includes a payment/card reader (such as a swipe style reader, a near field communication (NFC) or RFID reader, or some other contactless means) and a numeric key pad (i.e. PIN pad) where the consumer can, when required, allow the card to be read (e.g. by swipe, insert, or wave the card) and enter an authorization PIN (personal identification number).

4 Claims, 2 Drawing Sheets

FINANCIAL TRANSACTION TERMINAL

CROSS-REFERENCE TO RELATED APPLICATIONS

This application claims the benefit under 35 USC 119 of U.S. provisional application No. 61/699,530, filed on Sep. 11, 2012, which is incorporated herein by reference.

BACKGROUND OF THE INVENTION

A common method for finalizing purchases between a consumer and a merchant is via a payment terminal located at a checkout location. Typically in a merchant environment, a merchant has (A) a merchant facing ECR (electronic cash register) that is used to identify the goods or services that a customer is purchasing (such as by scanning a bar code); (B) a merchant-facing payment terminal into which the merchant inputs the amount of the transaction and captures a customer's payment credentials via payment instrument (i.e. credit card, digital wallet, smartphone application, etc.); and (C) a customer-facing PIN (personal identification number) pad that enables a consumer to input a PIN number for debit card purchases. In this system, a customer pays for a good or service by handing the payment instrument to the merchant for the merchant to input in the merchant-facing payment terminal.

A disadvantage of the existing system is that it requires customers to hand over their payment instruments to merchants since the merchant-facing payment function is not separate from the merchant interface, unless the merchant chooses to turn the payment terminal to face the customer during the transaction, which is often difficult or impossible due to the physical placement of either the payment terminal or its cabling.

SUMMARY OF THE INVENTION

The system provides a two device solution for transaction processing, a merchant facing device (MFD) and a cardholder (customer) facing device CFD. What this means is that one device always faces the checkout representative of the merchant (the merchant facing device) and the other faces the consumer (the cardholder facing device). The CFD includes communications ports (i.e. Ethernet, dial, Wi-Fi, wireless) for transmitting transaction information through a payment processing network for payment approval, a payment/card reader (such as a contact or "smart card" reader, a near field communication (NFC) or Radio Frequency Identification (RFID) reader, or some other contactless means) a screen and a numeric key pad (i.e. PIN pad) where the consumer can, when required, allow the card to be read (e.g. by swipe, insert, or wave the card) and enter an authorization PIN (personal identification number). The MFD has no capability to input payment information, and thus includes no security-associated hardware features. The MFD includes a numeric keypad, printer and screen.

The MFD allows the merchant to key in the amount of a transaction to be finalized. The MFD transmits the transaction amount to the CFD. so that the cardholder can swipe the card, authorize the transaction, and OK the amount. The card holder presents the card to the CFD (e.g. allows it to be read), selects the payment instrument type, enters a PIN if it's a PIN based transaction, and approves the transaction (by pressing the enter key). The CFD than processes the transaction through the payment network and prints the receipt on the MFDs printer, and the display on the MFD is updated by the CFD to advise the merchant of the result of the payment processing. Where the MFD is a dumb interface, no transactional data is ever sent to the MFD, only print data. This further promotes security to the card user.

An advantage of the system is that the CFD is not a peripheral device but a standalone system with full processing power, security, and functionality. The MFD is an optional module that can be used by the merchant if desired. In other embodiments and other devices, such as cash registers, tablets, vending machines, and smartphones the CFD is able to communicate with legacy terminals so that the merchant need only upgrade the cardholder terminal to take advantage of the system.

DETAILED DESCRIPTION OF THE INVENTION

The system provides a CFD that includes full independent processing capability, functionality, and upgradable security. The CFD can communicate to an MFD that is part of the system and/or it can communicate directly with a legacy ECR. The CFD can satisfy applicable security standards including PCI (Payment Card Industry) requirements set by credit card associations and EMVCo (Europay, MasterCard and Visa). These standards are upgraded periodically. The present system allows a legacy system to satisfy PCI and EMVCo requirements by building compatibility and compliance into the CFD.

Figure 1:
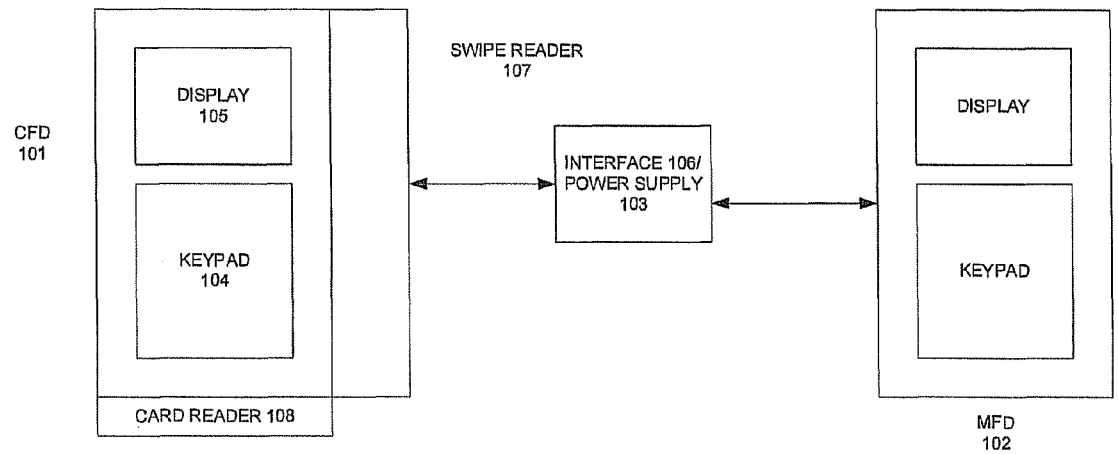
FIG. 1 illustrates an embodiment of the system.

FIG. 1 illustrates an embodiment of the system. A CFD 101 is coupled to an optional MFD 102 through interface 106 with power provided by PSU 103. The CFD includes a keypad 104 and display 105 for use by a cardholder during a transaction. The merchant can enter transaction information into the MFD 102 using its keypad and the information is provided to the CFD 101. The cardholder sees the transaction information on the display 105. The CFD 101 includes a card reader 108 which may be a smartcard reader, RFID system, or other contactless reading system. The system can also include a swipe reader (MSR 107) for reading payment or credit card information. The cardholder can use keypad 104 to enter PIN information when required and to authorize the transaction.

The card reader 108 may be a smart card reader or any suitable method of receiving, credit card information from a user. In one embodiment, the card reader can incorporate RFID technology so that the cardholder need only bring an RFID enabled credit card or token into reading range. Any other contactless method of card reading may be implemented as well without departing from the scope and spirit of the system.

In one optional embodiment, the CFD 101 may include an integrated printer for providing a transaction receipt to the user.

Figure 2:
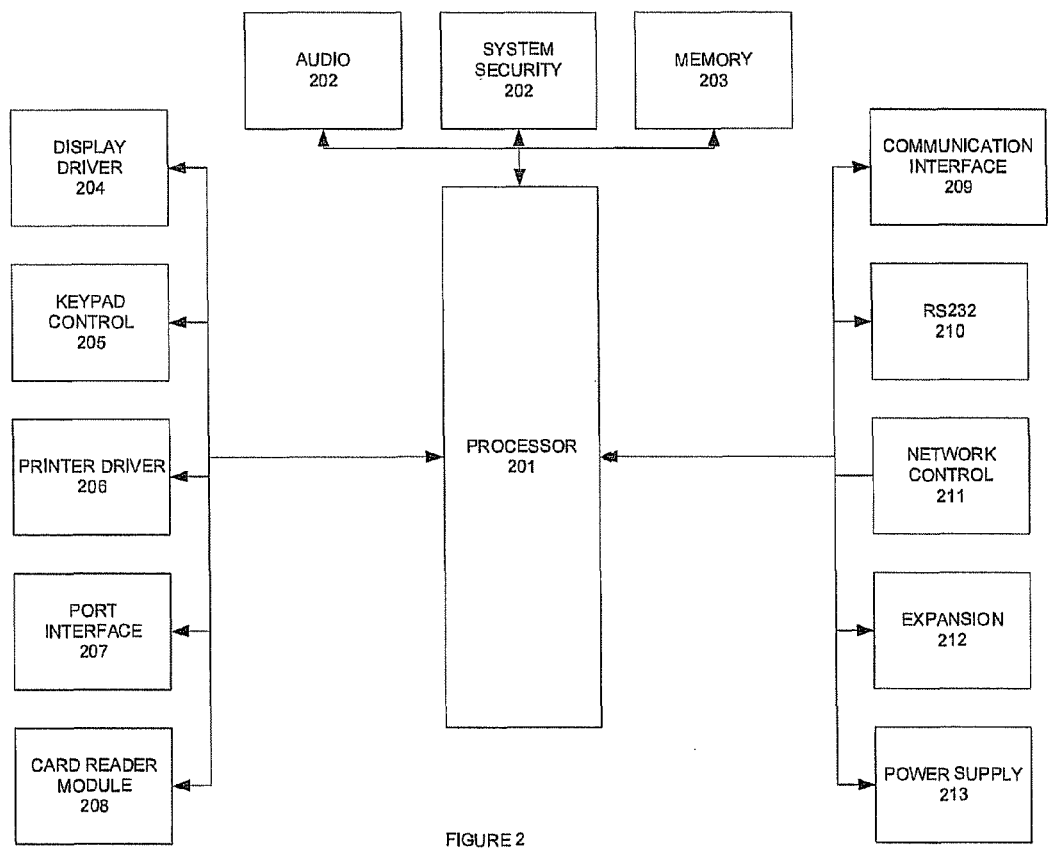
FIG. 2 is a functional block diagram of an embodiment of a CFD.

FIG. 2 is a block diagram of an embodiment of the CFD 101. The CFD 101 comprises a processor 201. The processor includes software for controlling the functionality of the CFD 101, including security, encryption, communication, upgrading, and the like. The CFD 101 includes an audio component 202 for providing audio feedback for a variety of functions, including key activation if desired. A system security module 202 provides upgradable encryption and security functions and can provide compliance with PCI standards. Memory 203 is used for data and program storage, and OS residence for processor 201.

Display driver 204 and keypad controller 205 interface with keypad 104 and display 105. Printer driver 207 controls the optional printer. A port interface is provided for USB and other ports as desired. Card reader module 208 controls all manner of card reading including MSR, RFID, contactless, and the like.

Communication interface 209 is used to control communication between the CFD 101 and MFD 102, and/or with legacy terminals or other merchant devices. Other communication (such as with a transaction processor host) may be wired or wireless as desired and may manage a modem, USB, Ethernet, Wi-Fi, PSTN, 3G, or any other method of communication between the CFD and a merchant device. In one embodiment, the system includes an RS232 port which may be used, in part, to help upgrade or program the CFD 101. Network control 211 is used so that the CFD 101 may be part of a LAN. The system includes expansion slots 212 and power supply 213.

In one embodiment, the MFD may include similar functional elements as in the CFD. In other instances, the MFD may be a peripheral device to the CFD, reducing the cost of the MFD.

Figure 3:
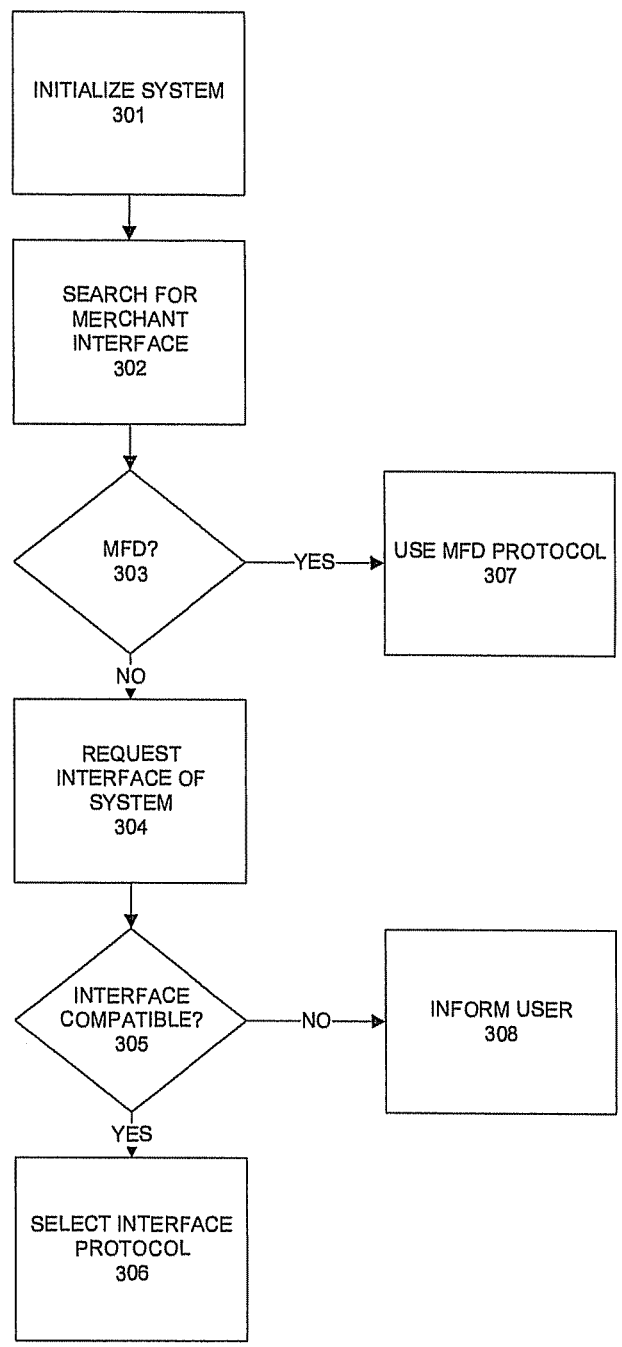
FIG. 3 is flow diagram illustrating initialization of a CFD in one embodiment of the system.

FIG. 3 is a flow diagram illustrating initialization of a CFD in a merchant system in one embodiment. At step 301 the system is initialized. At step 302 the CFD searches for the merchant interface. At decision block 302 it is determined if the merchant interface is the optional MFD. If so, the system proceeds to step 307 and uses the MFD communication protocol built into the system.

If not, the system proceeds to step 304 and requests the interface of the merchant system. At decision block 305 the system determines if the offered interface is one with which the CFD is compatible. If not, the system informs the user at step 308. If so, the system proceeds to step 306 and selects the appropriate interface protocol and communication method for the merchant interface.

The invention claimed is:

1. A financial transaction system comprising:
a customer facing device having
communication ports for transmitting transaction information through a payment processing network for payment approval;
a card reader;
a numeric key pad; and
a display screen, wherein the customer facing device is a standalone system with full processing power, security and functionality;
a merchant facing device with no capability to input payment information and no security-associated hardware features; and
an interface having its own power supply and coupling the customer facing device to the merchant facing device,
wherein the merchant facing device transmits a transaction amount to the customer facing device via the interface.

2. The financial transaction system of claim 1, wherein
the merchant facing device allows a merchant to enter and transmit the transaction amount to the customer facing device, and
the customer facing device obtains a payment instrument type and authorization of a cardholder to process a transaction, and then processes the transaction through the payment network.

3. The financial transaction system of claim 2, wherein the customer facing device sends print data to the merchant facing device such that a receipt may be printed on a printer of the merchant facing device, and sends display data to the merchant facing device such that a result of the payment processing may be displayed on the merchant facing device.

4. The financial transaction system of claim 3, wherein the merchant facing device is a dumb interface and no transactional data is sent to the merchant facing device.

* * * * *